United States Patent [19]
Maiers et al.

[11] Patent Number: 5,654,848
[45] Date of Patent: Aug. 5, 1997

[54] VOICE COIL MOTOR FOR A DISC DRIVE

[75] Inventors: Michael Alan Maiers, San Jose; Michael John Raffetto, Scotts Valley; Chul Soo Kim, Los Gatos; Fredrick Frank Kazmierczak, San Jose; Bradley Kelemen, Santa Cruz, all of Calif.

[73] Assignee: Seagate Technology, Inc., Scotts Valley, Calif.

[21] Appl. No.: 954,981

[22] Filed: Sep. 30, 1992

[51] Int. Cl.⁶ .................................... G11B 5/012
[52] U.S. Cl. ...................... 360/98.01; 360/97.01
[58] Field of Search ...................... 360/97.01, 97.02, 360/97.03, 98.01, 99.08, 106

[56] References Cited

U.S. PATENT DOCUMENTS

| | | | |
|---|---|---|---|
| 4,414,594 | 11/1983 | Farmer et al. | 360/106 |
| 4,491,888 | 1/1985 | Brown et al. | 360/99.08 |
| 5,109,310 | 4/1992 | Ohkjita | 360/99.08 |

FOREIGN PATENT DOCUMENTS

| | | | |
|---|---|---|---|
| 0467556 | 1/1992 | European Pat. Off. | 360/106 |
| 62-279586 | 12/1987 | Japan | 360/97.01 |
| 1-102781 | 4/1989 | Japan | 360/104 |

*Primary Examiner*—Robert S. Tupper
*Assistant Examiner*—David D. Davis
*Attorney, Agent, or Firm*—Edward P. Heller, III

[57] ABSTRACT

A reduced-height structure for a voice coil motor which forms a portion of the actuator in a disc drive data storage device includes a through opening in the base member of the disc drive housing within which the lower pole piece of the voice coil motor is mounted. A top pole piece of the Voice coil motor is mounted directly to the top cover of the disc drive housing and proper spacing between the top pole piece and the voice coil motor components mounted to the base a member is determined and maintained by a precisely machined surface in the base member. The lower pole piece is preferably mounted to the base member with cold-flowed brass rivets.

3 Claims, 7 Drawing Sheets

5,654,848

VOICE COIL MOTOR FOR A DISC DRIVE

BACKGROUND OF THE INVENTION

1. Field of the Invention

This invention relates generally to the field of rigid disc drive data storage devices, and more particularly to an improved structure and mounting scheme for the voice coil motor used in the actuator that moves the read/write heads from track to track on the surface of the disc.

2. Brief Description of the Prior Art

Disc drive data storage devices of the type called "Winchester" disc drives are well known in the industry. Demands for increased performance and capacity have lead in recent years to the almost exclusive use of a voice coil motor (VCM) as the motive force to move the heads from track to track on the disc surface, and pressures for smaller form factors for the entire drive have again lead to almost total dominance in the marketplace of so-called "rotary VCM" actuators. In such an actuator, the read/write heads—and any associated dedicated servo heads—are cantilevered outward over the disc surfaces from a common pivot structure, while the coil of the VCM extends horizontally outward from the other side of the pivot structure. A permanent magnet and pole piece structure is fixedly mounted to the housing of the disc drive in such an arrangement that the flat coil is supported in the middle of the magnetic field formed by the permanent magnets. Sophisticated control logic applies a carefully calculated amount and polarity of DC power to the ends of the coil to controllably move the coil within the magnetic field, thus moving the heads, which are fixed in relationship to the coil, across the disc surfaces.

The current trend toward smaller form factors for disc drives has lead to the current generation of 3 inch and 2 inch disc drives, with smaller sizes yet in the planning and design stages. These small sizes have caused a significant reduction in the amount of space available for the mechanical components of the disc drive.

A typical voice coil motor (VCM) for imparting motion to the heads has commonly been built as a separate sub-unit of the disc drive and then installed inside a housing which controls contaminants in the area of the heads and discs. Such a motor usually consists of a vertical stack of components including a lower pole piece, a permanent magnet, a coil, and an upper pole piece, with an air gap on either side of the coil. Fastening this structure to a housing base and sealing the unit with a top cover creates a vertical accumulation of components and necessary air gaps that severely limits the amount of size reduction possible. Similarly, stacking all these components on top of one another causes a significant buildup of unavoidable tolerancing errors.

It is therefore desirable to create a disc drive incorporating a VCM which has a minimum vertical dimension and minimum areas for tolerance error buildup.

SUMMARY OF THE INVENTION

The voice coil motor of the present invention solves the problem of excess vertical size and tolerance accumulation by providing a motor in which the housing base of the disc drive is opened in the motor area and the lower pole piece of the voice coil motor is mounted to lie in the space normally occupied by the bottom plate of the housing base. This mounting is preferably accomplished using brass rivets which are compressed to cold-flow into mating holes in the lower pole piece and the base member. The top pole piece is integrated with the top cover to eliminate the spacing usually provided between the motor and the top cover and a machined feature on the base casting is used to define the proper air gap between the coil and the upper pole piece. An adhesive-backed planar member is then used to provide the necessary air-tight seal between the motor and the housing base.

It is an object of the present invention to provide a disc drive incorporating a voice coil motor and having the maximum sized magnetic components within a minimum vertical dimension.

It is another object of the present invention to provide a voice coil motor structure for a disc drive in which the number of dimensional tolerances in the vertical axis is minimized.

It is another object of the present invention to provide a voice coil motor which is inexpensive and simple to manufacture in a high volume production environment.

These and other objects and features of the present invention will be best understood by referencing the following detailed description in combination with the accompanying drawings.

DETAILED DESCRIPTION OF THE PREFERRED EMBODIMENT

Figure 1:
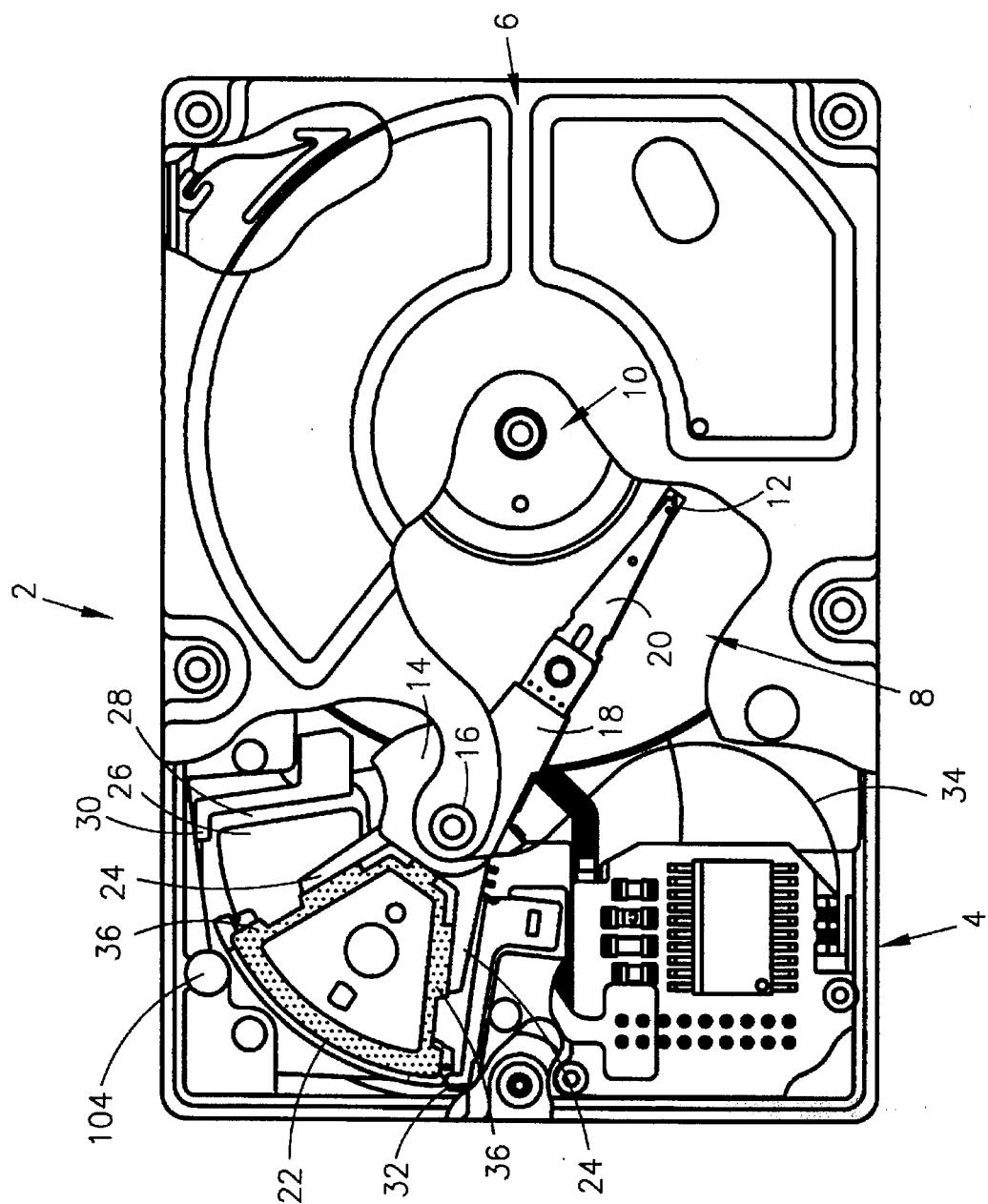
FIG. 1 is a top view of a disc drive incorporating the voice coil motor structure of the present invention.

Referring now to the drawings and more particularly to FIG. 1, shown is a disc drive 2 of the type particularly suited for use of the present invention. The disc drive 2 includes a housing base 4 to which the majority of internal components are mounted and a top cover 6 which joins with the housing base 4 to form an internal environment free from externally generated contaminants. At least one disc 8 is mounted for rotation on a spindle motor (not shown) by a disc clamp 10. The surfaces of the disc 8 contain a plurality of circular, concentric tracks (not designated) on which data may be recorded and from which data may be retrieved. An array of vertically aligned heads, one of which is shown at 12, is mounted to a actuator body 14 rotatable about a pivot shaft, shown generally at 16, by an arrangement of head arms 18 and load beam/gimbal assemblies 20. A voice coil motor (VCM) is shown generally in the upper left corner of the disc drive 2. In the view of FIG. 1, the top cover 6 has been cut away in the area of the VCM to reveal a coil 22 mounted between two actuator arms 24 which are an integral part of the actuator body 14. Below the coil 22 is a permanent magnet 26 fixedly mounted to a lower pole piece 28 which in turn is attached to the housing base 4. The range of motion of the coil 22 about the pivot shaft 16 is defined by a limit stop 30 and a latching limit stop 32. Controlled DC current is passed to the coil 22 via a flexible printed circuit cable (pcc) 34. The interaction of the magnetic field induced in the coil by DC current and the magnetic field of the permanent magnet 26 results in motion of the coil 22 relative to the permanent magnet 26 in accordance with the well known Lorentz relationship, thus moving the heads 12 from track to track on the surface of the discs 8. Electrical signals for recording—or writing—to the discs 8, and retrieving—or reading—from the discs are carried via the same pcc 34 which carries the controlled DC for the coil 22.

In the view of FIG. 1, the coil 22 can be seen to have two radial arms 36 extending toward the pivot shaft 16. It is the passage of current through these radial arms 36 which causes the motion of the coil 22 relative to the permanent magnet 26, as will be seen below.

Figure 2:
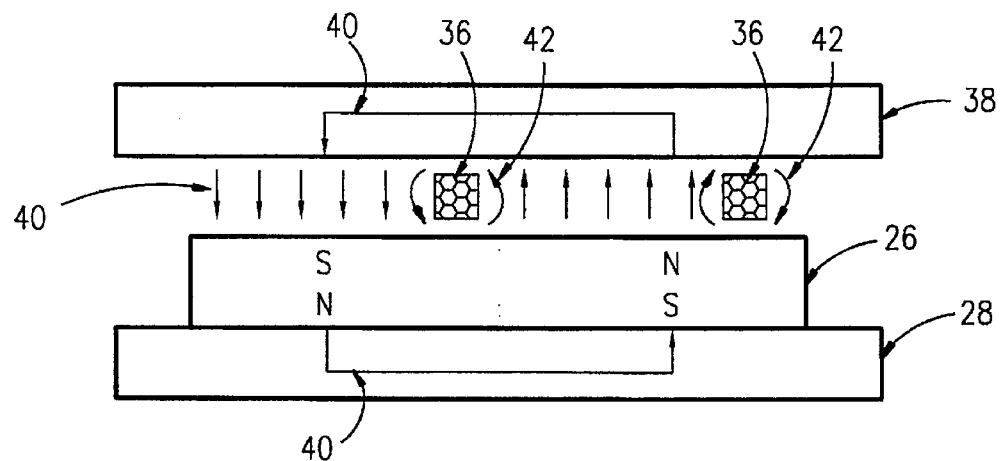
FIG. 2 is a diagrammatic sectional view of the major components of a voice coil motor structure.

FIG. 2 is a diagrammatic sectional view of the major components of a voice coil motor, such as will be described below in relationship to the present invention. The stationary components of the VCM include the permanent magnet 26, the lower pole piece 28 and an upper pole piece 38. The permanent magnet 26 can be seen to be divided into two segments, with the left segment polarized south on top and north on the bottom, while the right segment is polarized in the opposite direction. This polarity of the magnet causes the magnetic flux to flow in a clockwise direction as shown by arrows 40. The radial arms 36 of the coil 22 are also shown in section. It must be recalled that the DC current flowing through the coil will cause a magnetic field to be built up around the coil and that this magnetic field will be polarized in opposite directions in the two radial arms 36, as represented in FIG. 2 by arrows 42. It is the interaction between the stationary magnetic flux field of the permanent magnet 26 and the coil magnetic flux field that causes the coil to move relative to the stationary components. In the view of FIG. 2, the coil radial arms 36 are shown at or near the extreme right end of their range of motion, since the two radial arms 36 can never be positioned above the same segment of the permanent magnet 26 without trying to move in opposite directions.

Figure 3:
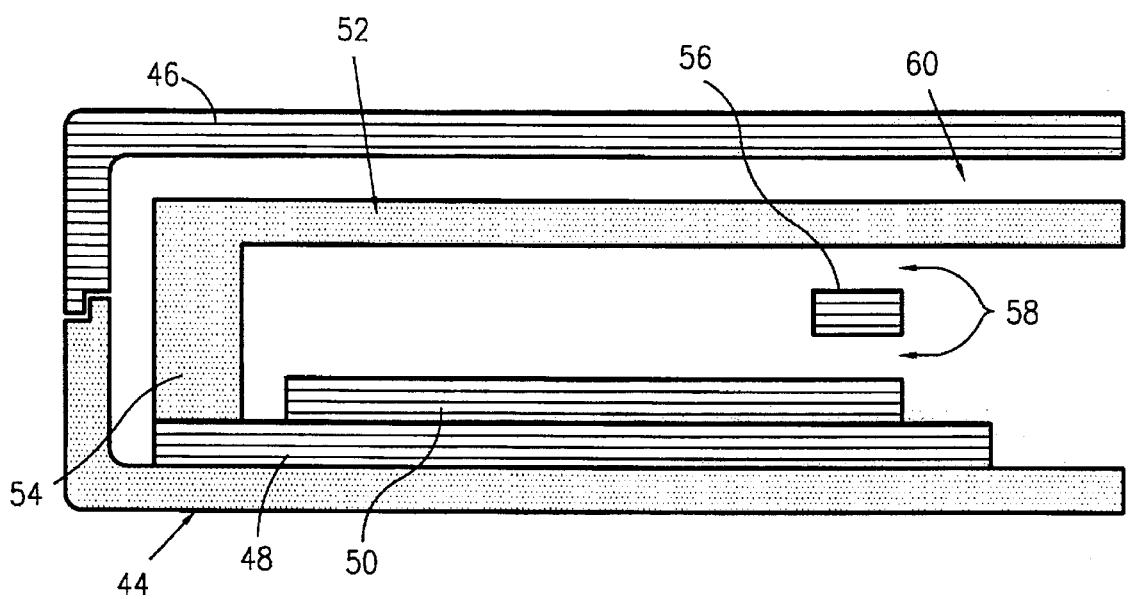
FIG. 3 is a diagrammatic sectional view of a disc drive incorporating a prior art voice coil motor structure.

FIG. 3 shows a diagrammatic sectional view of a disc drive showing a prior art structure for the VCM. In FIG. 3, a housing base 44 and top cover 46 form a sealed environment to prevent external contaminants from entering the area of the heads and discs (both not shown). With the type of joint shown in FIG. 3 between the housing base 44 and top cover 46, a sealing element (not shown), such as that shown in U.S. Pat. No. 5,097,978, issued Mar. 24, 1992, Ser. No. 675,580, filed Mar. 8, 1991 (Eckerd) assigned to the assignee of the present invention, is used to ensure adequate sealing between the housing base 44 and top cover 46. A lower pole piece 48 is shown directly mounted to the housing base 44, and a permanent magnet 50 is mounted to the lower pole piece 48. An upper pole piece 52 is shown which is separated from the lower pole piece by a spacer 54. A coil 56 is shown suspended between the permanent magnet 50 and the upper pole piece 52 with an air gap 58 below and above the coil 56. A third air gap 60 is shown between the upper pole piece 52 and the top cover 46. In this diagrammatic view, each of the major components has been given an identical single-unit thickness for clarity, while in an actual disc drive unit, the relative height of each component would depend on materials, desired motor power, manufacturability and other considerations. With this structure, there are nine "units" of height:

1. the housing base 44;
2. the lower pole piece 48;
3. the permanent magnet 50;
4. the air gap 58 below the coil 56;
5. the coil 56;
6. the air gap 58 above the coil 56;
7. the upper pole piece 52;
8. the air gap 60 above the upper pole 52, and;
9. the top cover 46.

It will also be evident to one skilled in the art that the crucial dimensions in this structure are the air gaps 58 above and below the coil. If the tolerance allowance for the thickness of the coil 56 itself is ignored, and it is assumed that the coil 56 is supported at a defined height above the top surface of the housing base 44, there are three components whose individual tolerance allowances can contribute to variations in the dimensions of the air gaps 58. These are:

1. the thickness of the lower pole piece 48;
2. the thickness of the permanent magnet 50, and;
3. the height of the spacer 54.

Figure 4:
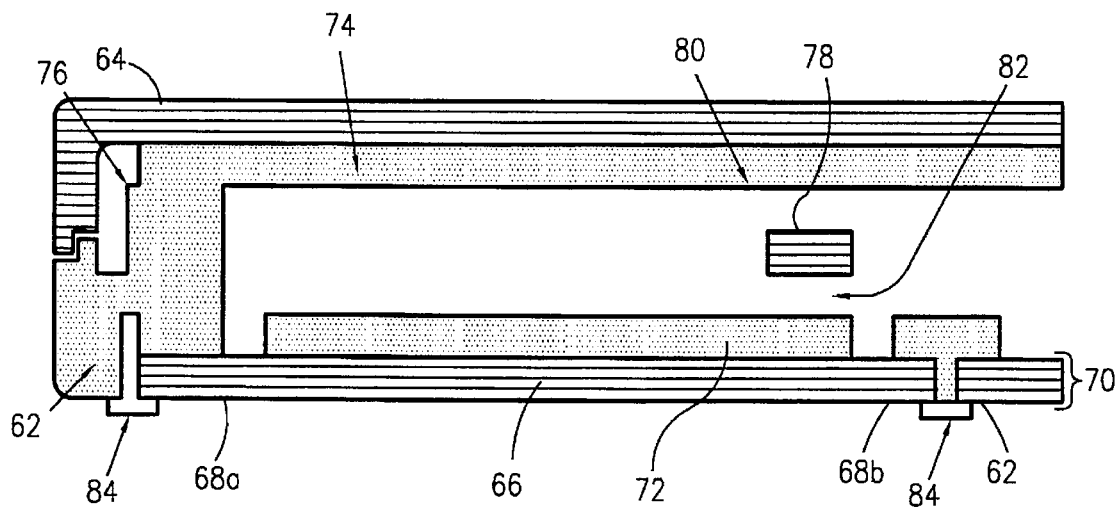
FIG. 4 is a diagrammatic sectional view of a disc drive incorporating the voice coil motor structure of the present invention.

Turning now to FIG. 4, shown is a similar VCM structure incorporating the present invention. Once again, major components have been given a common single-unit height for easy comparison with FIG. 3. FIG. 4 shows a housing base 62 and top cover 64 similar to those in FIG. 3, but in the VCM structure of the present invention, a hole has been opened in the housing base 62, and a lower pole piece 66 has been installed to internally machined surfaces 68a, 68b, so that the lower pole piece lies in the same horizontal plane with the bottom plate 70 of the housing base 62. A permanent magnet 72 is mounted to the lower pole piece 66 in a manner similar to that of FIG. 3. The top pole piece 74 of the VCM, however, is now mounted directly to the top cover 64, and the entire top cover/upper pole piece subassembly 64/74 is positioned relative to the lower pole piece 66 and permanent magnet 72 by a third machined surface 76 machined into the housing base 62. Once again, a coil 78 is suspended for motion between the permanent magnet 72 and the upper pole piece 74. The first apparent advantage to be gained by incorporation of the present invention is that the complete structure is now two "units" of height lower than the functionally similar structure of FIG. 3. This is because the lower pole piece 66 now occupies the same vertical space as the lower plate 70 of the housing base 62, and the air gap (60 in FIG. 3) between the top cover and the upper pole piece has been eliminated.

It will be readily apparent to one skilled in the art that the height reduction attained by the elimination of the air gap 60 between the upper pole piece 52 and the top cover 46 of FIG. 3, and the height reduction attained by making the lower pole piece and the lower plate of the housing base occupy the same vertical space are independent of each other. That is, a single "unit" of height could be saved by using the top cover/upper pole piece structure of FIG. 3 in combination with the lower pole piece/housing base of FIG. 4, or the top cover/upper pole piece structure of FIG. 4 in combination with the lower pole piece/housing base of FIG. 3.

Figure 4A:
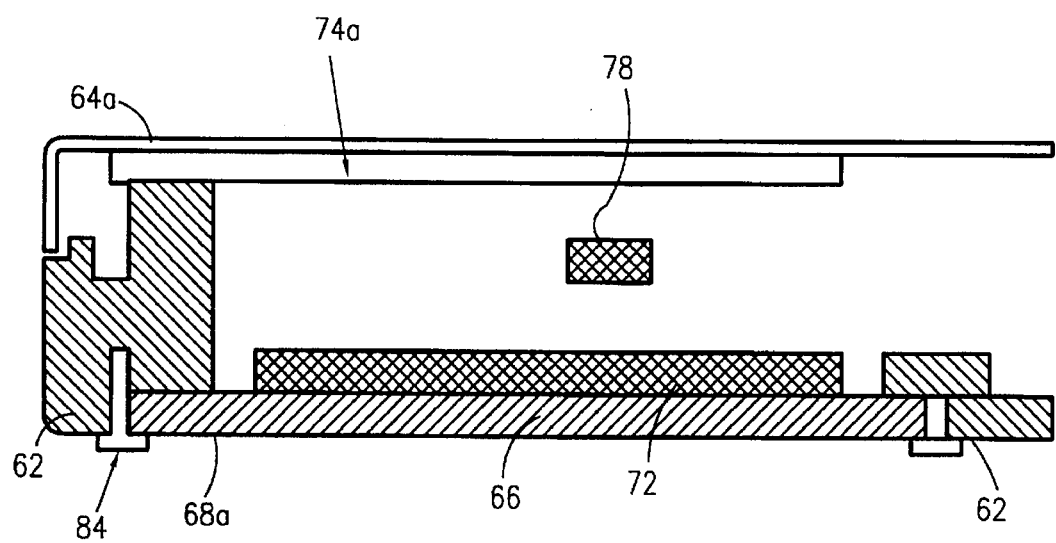
FIG. 4A is a diagrammatic sectional view of a preferred embodiment of the invention.

In actual practice yet another "unit" of height has been eliminated by forming the top cover from magnetically permeable material and thus making the top cover a part of the magnet mechanism of the VCM. This preferred embodiment is shown in FIG. 4A. In FIG. 4A, the housing base 62, lower pole piece 66, permanent magnet 72 and coil 78 are the same as were shown in FIG. 4. However, in FIG. 4A, it can be seen that the top cover 64a and upper pole piece 74a together occupy a single "unit" of height. This can be done without effecting the strength of the VCM because the top cover 64a is now made of thin sheet metal formed from the same or similar material used in the upper pole piece 74a. Since the top cover 64a and upper pole piece 74a are of the same magnetically permeable material, they can be dimensioned to both occupy the same vertical space as the upper pole piece alone in FIG. 4 without effecting the operating characteristics of the motor.

Another advantage of the VCM structure of the present invention is that there are fewer elements contributing to tolerance errors in the positioning of the coil 78 relative to the permanent magnet 72 and the upper pole piece 74. If, once again, variations in the thickness of the coil 78 itself and tolerance errors in the vertical position of the coil 78 are ignored, an analysis of FIG. 4 shows that the only tolerances controlling the location of the coil 78 relative to the permanent magnet 72 and the upper pole piece 74 are the thickness of the permanent magnet and the distance between the first machined surface 68a and the third machined surface 76. This arrangement makes control of the size of the air gaps 80, 82 above and below the coil more accurate, and, as is well known to persons skilled in the art, control of the air gap size is an important element in controlling the power of the VCM.

Another element necessitated by the structure of the present invention is a sealing element 84 used to bridge the gap between the housing base 62 and the lower pole piece 66. This sealing element 84 is preferably formed as a die-cut plastic backing member with a contact adhesive on one side for attachment to the housing base 62 and the lower pole piece 66. The exact configuration of the sealing element is dependent on the configuration of the opening in the housing base 62 and the lower pole piece 66, and an example of these elements will be discussed below.

Figure 5:
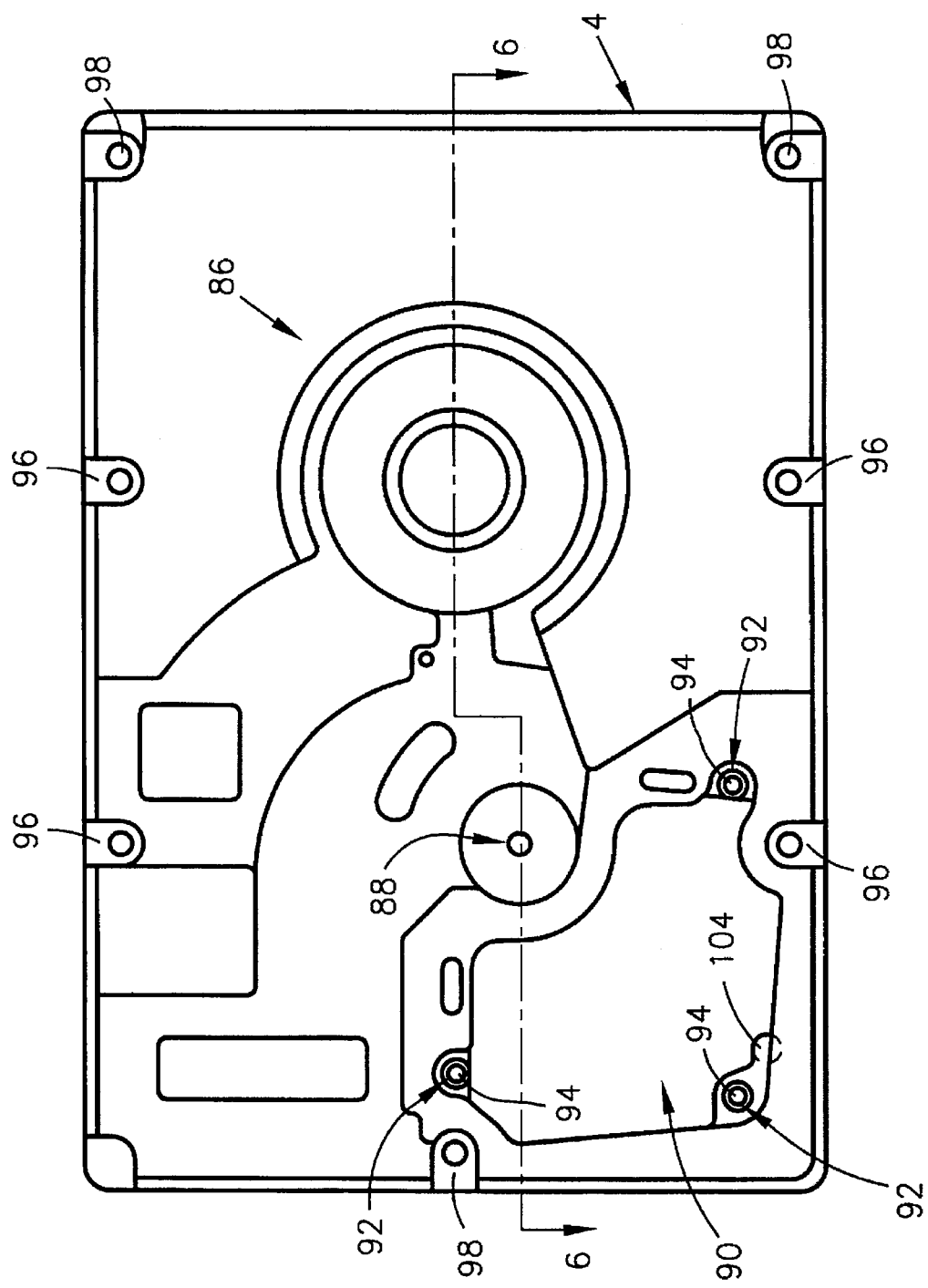
FIG. 5 is a bottom plan view of a housing base, including features of the present invention.

FIG. 5 shows the housing base 4 of the disc drive of FIG. 1 as seen in a bottom plan view. Housing bases of this type are typically cast aluminum with necessarily precise features machined after casting. The housing base 4 includes a feature shown generally at 86 for mounting the spindle motor (not shown) which supports and spins the discs (8 in FIG. 1). A second feature 88 is provided for the mounting of the pivot shaft (16 in FIG. 1) about which the actuator body (14 in FIG. 1) rotates during movement of the heads (12 in FIG. 1). FIG. 5 also shows that an opening 90 has been provided in the housing base 4 for mounting the lower pole piece/permanent magnet subassembly (not shown). This opening 90 is generally triangular in shape, and precision-machined mounting pads 92 with holes 94 in their centers have been included in the housing base 4 at the three corners of the opening 90 and closely adjacent the periphery of the opening 90. These three mounting pads 92 provide a planar surface for the attachment of the lower pole piece/permanent magnet subassembly (not shown), which will be described below.

FIG. 5 also shows an array of four mounting feet 96 which are used to mount the entire disc drive assembly into a computer or memory subsystem, and three board mounting pads 98 which are used to attach a printed circuit board (not shown) which carries all the electronic components necessary to operate the disc drive.

Figure 6:
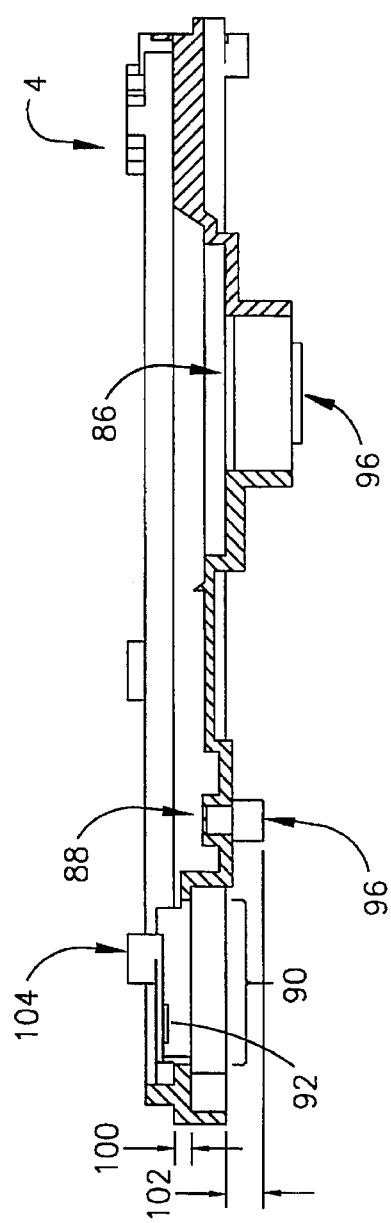
FIG. 6 is a sectional view of the housing base of FIG. 5, taken along line 6—6 in FIG. 5.

FIG. 6 is a sectional view of the housing base 4 taken along line 6—6 of FIG. 5. The section is taken through the center of the spindle motor mounting feature 86 and the pivot shaft mounting feature 88. The opening 90 in the housing base 4 is shown to lie in the same general vertical space 100 that would be taken up by the lower plate of the housing base 4. The mounting feet 96 can be seen to extend significantly below the opening 90, and this vertical space, designated generally at 102, is allocated for the printed circuit board (not shown) and its associated electronic components.

Also seen in FIG. 6 is a cast feature which is precision machined to produce a spacing surface 104, which is analogous to the third machined surface 76 in FIG. 4. This spacing surface 104, also seen in the plan view of FIG. 1, is used to define the minimum vertical spacing between the upper pole piece (not shown) which is attached to the top cover (also not shown) and the permanent magnet (also not shown) in a manner to be discussed below.

Figure 7:
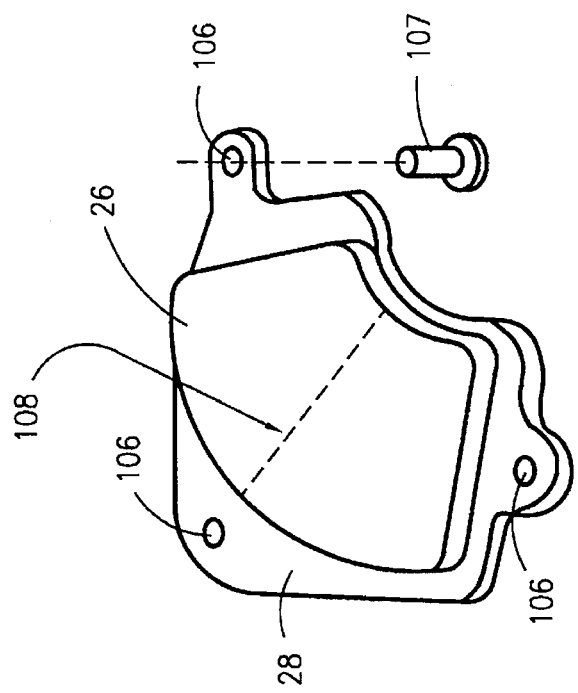
FIG. 7 is a perspective view of a lower pole piece and permanent magnet subassembly made in accordance with the present invention.

FIG. 7 is a perspective view of the lower pole piece 28 and permanent magnet 26 as assembled together. The lower pole piece 28 is formed of a magnetically permeable material, and practice has shown that a suitable material is electroless nickel plated AISI C1008 steel. The lower pole piece 28 is shaped to closely conform to the opening (90 in FIGS. 5 and 6) in the housing base 4, and has three mounting holes 106 for attaching the subassembly to the housing base 4. While a variety of fastener types might be suitable for this attachment, it has been found that the use of brass rivets 107 (one shown) conforming to ASTM standard B134 provides adequate strength, while maintaining minimum vertical dimensions. Once the lower pole piece 28 has been placed into the opening 90 in the base member 4 with the three mounting holes 106 aligned with the three mounting holes 94 in the base member 4, these rivets are inserted into the mounting holes 94/106 and compressed sufficiently to cause the rivets to cold flow, thus firmly attaching the lower pole piece/permanent magnet subassembly 28/26 to the base member 4.

The permanent magnet 26 is preferably of a neodymium-iron-boron composition. The magnet 26 is divided radially into two magnetic domains along dotted line 108, with one of the domains being magnetized N-S from top to bottom and the other being magnetized S-N from top to bottom, as was discussed in relationship to FIG. 2 above.

The subassembly consisting of the lower pole piece 28 and permanent magnet 26 is assembled to the housing base 4 with the magnet 26 projecting upward through the opening 90 in the housing base 4, and with the areas of the lower pole piece 28 immediately adjacent the mounting holes 106 in contact with the machined mounting pads 92 on the housing base 4.

Figure 8:
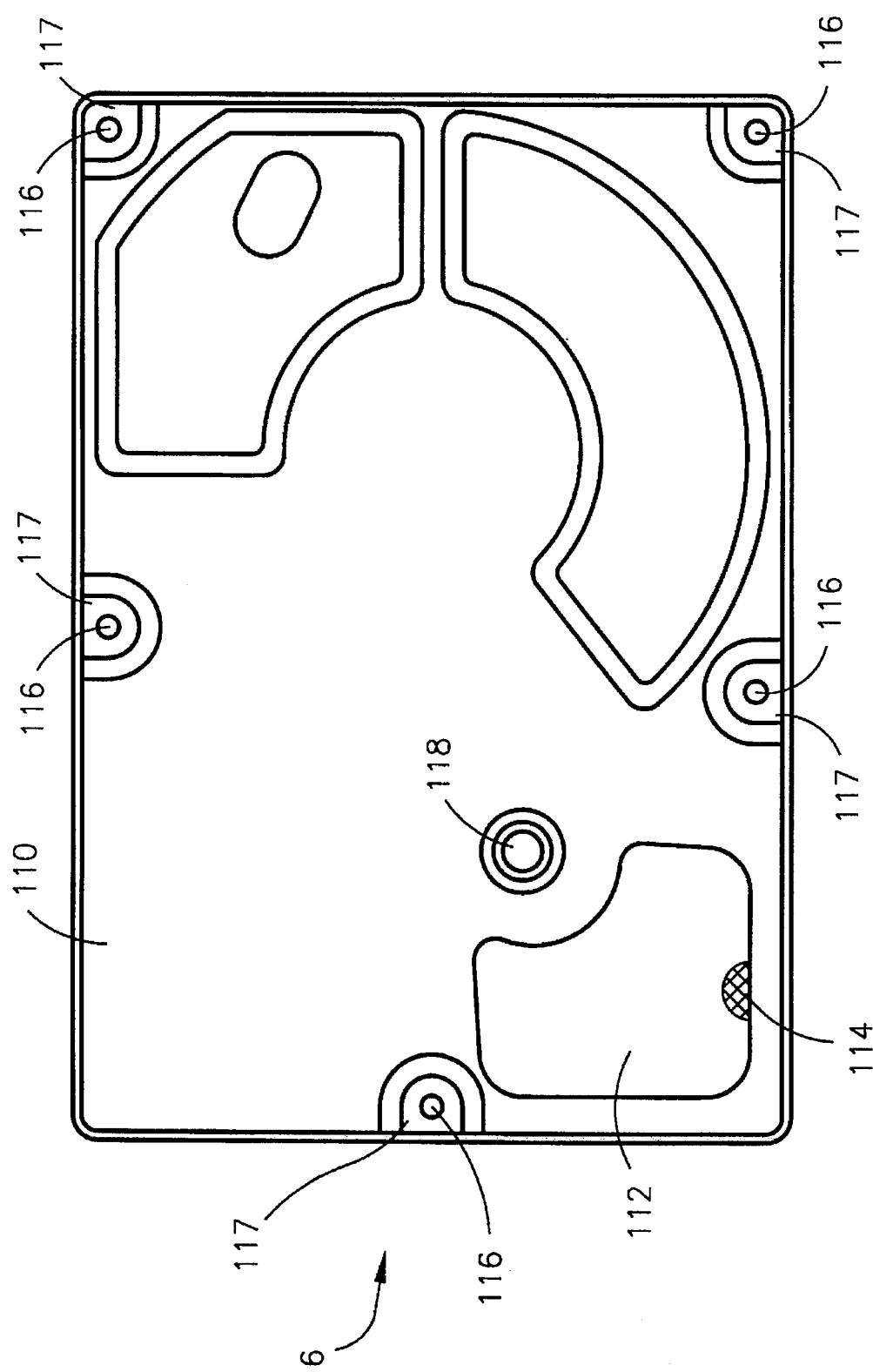
FIG. 8 is a bottom plan view of a top cover assembly made in accordance with the present invention.

FIG. 8 shows a bottom plan view of the top cover 6 of the present invention. The top cover is also a subassembly, consisting of a stamped cover member 110 and the upper pole piece 112. The cover member 110 is formed of C1008 steel, as is the upper pole piece 112. The two components are projection welded together, and then suitably coated for corrosion resistance with, as an example, electrodeposited paint. When the top cover 6 is assembled to the housing base 4, the spacing surface (104 in FIGS. 1 and 6) is horizontally aligned to contact the upper pole piece 112 in the cross-hatched area designated 114 to establish the minimum possible spacing between the permanent magnet 26, carried on the lower pole piece 28, and the upper pole piece 112. This spacing is critical, since the power—and thus the speed—of the actuator motor is dependent to a large degree on the proximity of the moving coil to the permanent magnet and the pole pieces. The ability to closely control variations in this spacing thus allows for a faster disc drive, as well as improved consistency from unit to unit.

The top cover 6 also includes a number of mounting holes 116 used to secure the top cover 6 to the housing base 4 with screws (not shown), and a single hole 118 through which a screw (not shown) can be inserted in the top of the actuator pivot shaft (16 in FIG. 1) to provide desirable rigidity. A number of flat mounting surfaces 117 are shown surrounding the mounting holes 116 which can be used in conjunction with complementary features on the housing base to establish the relative positions of the top cover 110 and the housing base.

Figure 9:
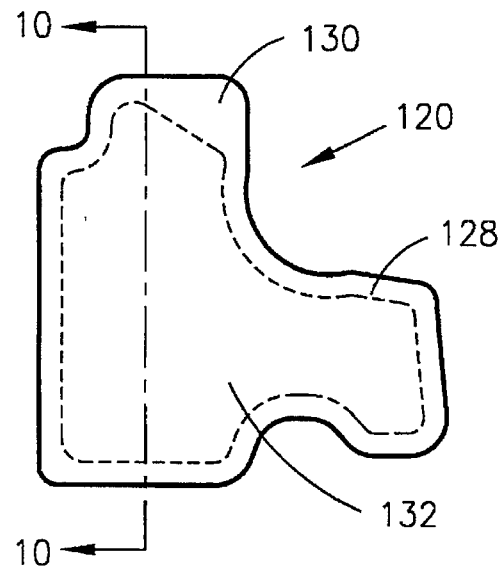
FIG. 9 is a bottom plan view of a sealing element which is a part of the present invention.

As was previously stated, when the lower pole piece/ permanent magnet subassembly 28/26 is mounted in the housing base 4, an unavoidable air gap is created in the disc drive housing, which would allow the entry of contaminants into the head/disc environment if not properly sealed. FIG. 9 shows an example of a sealing element 120 which can be used to ensure the integrity of the disc drive housing. As can be seen by comparing the shape of the sealing element 120 to the opening 90 in the housing base 4, as shown in FIG. 5, the sealing element 120 is shaped to extend beyond the maximum boundaries of the opening 90.

Figure 10:
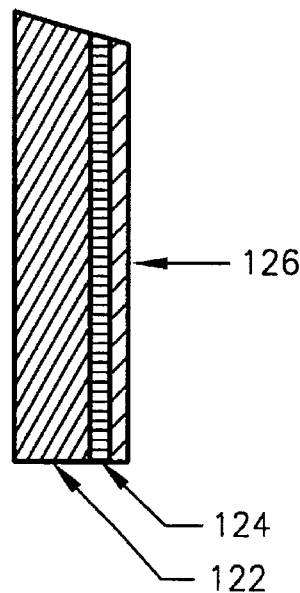
FIG. 10 is a partial sectional view of the sealing element of FIG. 9, taken along line 10—10 in FIG. 9.

The sealing element 120 itself is actually made up of three components, as can be seen in FIG. 10, which is a partial cross-section of the sealing element taken along the line designated 10—10 in FIG. 9. The primary component of the sealing element 120 is a non-porous material 122 such as 0.005" thick Mylar. Onto this material 122, a pressure sensitive adhesive 124 such as 3M type 300 High Strength acrylic is deposited, and a peelable backing 126 of clear polyester or similar material is attached for convenience in handling. This peelable backing 126 would be removed at the point of manufacture of the disc drive and the sealing element 120 applied to the underside of the housing base 4, bridging the gap created between the lower pole piece 28 and the housing base 4 to create a sealed environment which prevents the entry of external contaminants into the disc drive. The removal of the backing 126 can expose either the entire adhesive 124, or, preferably, the backing 126 may be scored or die cut to allow only partial exposure of the adhesive 124. Returning to FIG. 9, the dotted line 128 represents one such possible location for the scoring. A comparison of FIG. 9 to FIG. 5 will point out that if the backing material is removed only from the area 130 outside the score line 128, leaving the backing in place in the area 132 inside the score line 128, the adhesive will contact only the housing base 4, providing an adequate seal, while easing any necessary re-work operation.

From the foregoing discussion, it can be seen that a voice coil motor structure for a disc drive head actuator has been described which allows for a minimal vertical height and which includes a minimum number of components which can contribute to vertical tolerance error buildup. Such a structure is both simple and inexpensive to manufacture in large volume.

It will be clear that the present invention is well adapted to carry out the objects and attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

We claim:

1. A voice coil motor structure for an actuator in a disc drive, said disc drive including a base member and a top cover intended for assembly together to form a sealed environment to prevent the entry of external contaminants, the motor structure comprising a lower pole piece of magnetically permeable material mounted to the base member, a permanent magnet mounted to the lower pole piece, and an upper pole piece mounted directly to the top cover at a position opposite the lower pole piece, the top cover formed of a magnetically permeable material and forming a part of a magnetic circuit of the voice coil motor.

2. A voice coil motor structure for an actuator in a disc drive, said disc drive including a base member and a top cover intended for assembly together to form a sealed environment to prevent the entry of external contaminants, the motor structure comprising an opening in the base member;

a lower pole piece of magnetically permeable material mounted in the opening in the base member such that the lower pole piece substantially occupies the vertical space forming the opening in the base member, a permanent magnet mounted to the lower pole piece, and an upper pole piece mounted directly to the top cover at a position opposite the lower pole piece, the top cover being formed of a magnetically permeable material and forming a part of a magnetic circuit of the voice coil motor.

3. A disc drive comprising:

a base casting including a first downward facing machined surface and a second upward facing machined surface;

a pair of magnetically permeable pole pieces; one of the each abutting against a respective machined surface;

at least one permanent magnet mounted on at least one of said pole pieces;

said base casting further including a bottom plate having an aperture and a first of said pole pieces being sized to substantially fill said aperture; and a disc drive top cover adapted for mating with said base casting, the second of said pole pieces being mounted directly on said disc drive top cover;

the disc drive top cover being formed of a magnetically permeable material and acting as a part of a magnetic circuit formed by the permanent magnet and pole pieces.

* * * * *